United States Patent [19]

Noguchi

[11] Patent Number: 4,642,241

[45] Date of Patent: Feb. 10, 1987

[54] METHOD FOR THE PREPARATION OF TEXTURED SOYBEAN DRAFF

[75] Inventor: Akinori Noguchi, Sakura, Japan

[73] Assignees: Director of National Food Research Institute; Ministry of Agriculture, Foresty and Fisheries, both of Yatabe, Japan

[21] Appl. No.: 703,706

[22] Filed: Feb. 21, 1985

[30] Foreign Application Priority Data

Dec. 27, 1984 [JP] Japan ................................ 59-273840

[51] Int. Cl.$^4$ .................................................. A23L 1/20
[52] U.S. Cl. ..................................... 426/634; 426/516
[58] Field of Search ................................ 426/634, 516

[56] References Cited

U.S. PATENT DOCUMENTS

| | | | |
|---|---|---|---|
| 4,049,840 | 9/1977 | Reesman et al. | 426/634 |
| 4,117,174 | 9/1978 | Tonouchi et al. | 426/634 |
| 4,427,710 | 1/1984 | Terada et al. | 426/634 |
| 4,540,592 | 9/1985 | Myer et al. | 426/516 X |

FOREIGN PATENT DOCUMENTS 0187155  11/1983  Japan ................................ 426/634

*Primary Examiner*—Robert Yoncoskie
*Attorney, Agent, or Firm*—Frishauf, Holtz, Goodman & Woodward

[57] ABSTRACT

A process for the preparation of a textured okara useful as a food component comprising feeding okara to a twin-screw extruder and heating and applying pressure in said extruder to said okara and forcing said okara through a constricted exit port from said extruder into a cooling die wherein said okara is cooled, and forcing said cooled okara having a textured structure out of the cooling die.

16 Claims, 7 Drawing Figures

Untreated "Okara"

50 Microns

Treated "Okara"

50 Microns

METHOD FOR THE PREPARATION OF TEXTURED SOYBEAN DRAFF

BACKGROUND OF THE INVENTION

The present invention relates to a method for the preparation of textured soybean draff or, more particularly, to a method for the preparation of textured soybean draff as a palatable high-protein foodstuff material.

Soybean is a very important raw foodstuff in Japan and other Oriental countries which can be processed into three major traditional foods including tofu, i.e., soybean curd, miso, i.e., fermented salty paste, and soy sauce. Tofu is a curd-like coagulation of the proteinous extract from soybeans in water separated by squeezing or pressing from the residue or soybean draff, which is called "okara" using the Japanese word. Okara contains large amounts of useful and nutrient proteins which are not extracted or which are less soluble in water. The amount of okara, i.e., soybean draff produced as a by-product in the manufacture of tofu is almost equal by weight to that of the starting raw soybeans since the soybean draff contains water in a large percentage. Moreover, soybean draff is also produced as a by-product in soybean processes other than the manufacture of tofu. The estimated annual yield of such soybean draff in Japan was as large as about 700,000 tons in 1983.

The soybean draff or okara is highly nutrient. It is typically constituted of 22% of proteins, 19% of fats, 38% of carbohydrates or saccharides, 15% of fibrous matter and 6% of ash on the dry basis (see, for example, Foodstuff Development, Vol. 19, No. 8, pages 11–18 (1984)). The protein utilization (NPU) of okara is 62% and even better than the corresponding value 45% of tofu per se. A problem in utilizing okara or soybean draff is the difficulty in handling due to the very high water content of 80% by weight or more. Dehydration of okara to decrease the water content is technologically difficult and economically almost impossible. Okara as a food has the disadvantage of extremely high susceptibility to putrefaction as a consequence of its high nutrition content and high water conent.

In recent years the trend has been that this nutritive food has less and less chance of use in the human diet. It is utilized almost exclusively as a feed for domestic animals and poultry. A very large part of the production of okara occurs in locations near big cities due to the location of the manufacturer of the principal food products which produce okara as the byproduct. The amount of the okara utilizable as a feed is limited because stock raising is usually not a principal industry in the vicinity of big cities. Therefore, a large part of the okara or soybean draff can find no other way of disposal than to be discarded as a waste material involving a serious problem of possible environmental pollution in the near future.

The aforedescribed situation relative to the disposal of this nutritional material (okara) is particularly unfortunate for those countries deficient in foodstuff resources or, in particular, in protein resources.

In the prior art, a textured protein of vegetable origin is prepared by the treatment of defatted soybeans or other material at an elevated temperature and under an applied pressure in a single-screw extruder machine. This process is suggestive of the mechanism that the protein molecules in the defatted soybeans having almost completely lost functional properties are further unfolded under the conditions of high temperature and high pressure produced inside the extruder so that the reactive groups of the protein molecules initially enveloped within the molecules have been exposed and reacted and a textured product is formed. By analogy to defatted soybeans, an attempt has been made for the texturization of okara by the above mentioned method using a single-screw extruder machine but the results obtained were unsatisfactory presumably due to the high water content of the okara.

SUMMARY OF THE INVENTION

It is an object of the present invention to provide a novel method for processing okara to prepare a processed okara composition having good palatability as a human food which can be readily preserved.

Another object of the invention is to provide a novel method for the preparation of a textured high-protein foodstuff material of good preservability capable of being processed into a palatable human food starting from the okara soybean byproduct.

The present invention provides a process for the preparation of textured okara comprising continuously treating okara, wet or after dehydration, at an elevated temperature, preferably, in the range from 140° to 200° C., and at an elevated pressure in a twin-screw extruder machine equipped with a cooling die.

DETAILED DESCRIPTION OF THE PREFERRED EMBODIMENTS

Figure 1:
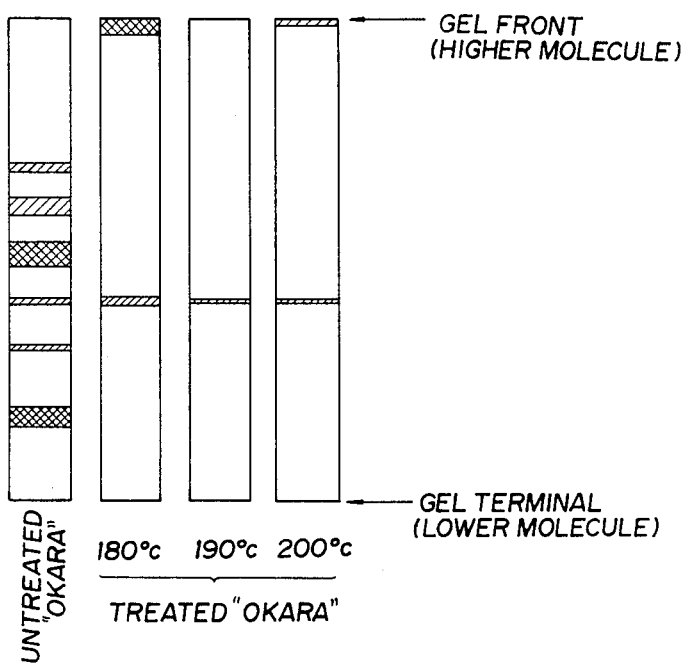
FIG. 1 illustrates the diagrams obtained in the electrophoresis of okara before and after the treatment at varied temperatures by the SDS-PAGE method.

The starting okara used in the present process is not limited in respect of the properties or type thereof. The okara can be okara of high water content and also dehydrated okara as well as mixtures thereof. The origin of the okara, i.e., the process in which it has been produced as a byproduct, is also not a limitation. The various grades of okara are suitable for use in the present process. The content of water in the starting okara is also not particularly limited. It is in the range, for example, from 5 to 80% by weight or, preferably, from 20 to 60% by weight. When the water content of the okara is outside of this range, it is preferable to adjust the water content to within this range.

It is optional in the present process that the okara product is admixed with additives so long as the properties inherently possessed by the okara or the textured product thereof are not adversely affected. Such additives include, for example, powdery or flaky defatted soybeans, proteins originating in soybeans and other vegetables, oilseeds, starches and the like. In particular, defatted soybeans and proteins originating in soybeans and other vegetables are preferred as the additive because the addition of these materials increases the protein content of the starting material and the extent of texturization with improved tensile breaking strength. The amount of these additives is in the range of from 10 to 70% by weight; preferably, in the range from 20 to 50% by weight based on the starting okara. The additives may be blended with the okara in advance prior to introduction into the extruder or may be introduced separately into the extruder through a feed port for the additives and then blended with the okara in the extruder.

Even when these additives are admixed with the okara, the water content in the starting material should be within the range of from 5 to 80% by weight or, preferably, from 20 to 60% by weight.

The starting okara is fed to a twin-screw extruder having an exit port and cooling die. In the extruder the okara is subjected to a continuous treatment at an elevated temperature under an applied pressure.

The twin-screw extruder has meshing screws rotating in the same direction or reversed directions. The shape of the screws is not particularly limited and includes trapezoidal and rounded profiles such as the Model BC 45 of Creusot-Loire, France, and Model C 58 of Werner & Pfleiderer, West Germany. It is essential that the twin-screw extruder has an exit port which feeds to the cooling die.

The starting okara with or without additives, is introduced into the extruder wherein it is agitated, kneaded and compressed in a manner according to the configurations and type of arrangement of the screws in the twin-screw extruder. When the water content of the okara fed into the extruder is excessively high, difficulties are encountered in the continuous running of the process in a stable manner. With an excessively high water content, under the conditions of high temperature and high pressure existing in the extruder, when the okara product is exited from the exit port, the lower outside pressure and temperature instanteously convert water into pressurized steam which expands greatly. The proteins contained in the okara have already reacted with each other at the high temperature to form a three-dimensional network structure while the material under treatment in the extruder has good flowability with low consistency due to the content of a large amount of water at an elevated temperature. Therefore, the product okara coming out of the exit port cannot withstand the pressurized steam generated just outside the port and is scattered in a pasty form with its structure destroyed.

It is in order to avoid such an undesirable phenomenon, namely, so-called bumping and to maintain the high internal pressure necessary for the reaction in the extruder and the stability of extrusion that the extruder machine used here must be of the twin-screw type having an exit port which is preferably of a smaller cross-section than the smallest cross-section of the space within the extruder filled by the okara. It is preferable to maintain the high pressure condition within the machine as a result of the increased resistance against the transfer of the material under treatment due to the constriction of the passage through the exit port.

The cooling die which is positioned in contact with and in front of the exit port is essential so that the extruded okara which has a relatively low consistency at the elevated temperature is cooled thereby increasing the consistency of the cooled product and avoiding destruction of the three-dimensional network structure formed in the extruder. The conversion of the water content in the treated okara into steam is also suppressed by the heat energy acquired by the material in the course of the treatment. The cooling die should be kept at a temperature in the range from room temperature to 0° C.

The starting material is treated in the twin-extruder under conditions of high temperature and high pressure. The temperature for the treatment, i.e., the temperature in the extruder is not particularly limited depending on the type of the starting okara and other factors but it is usually in the range from 140° to 200° C. and, preferably from 160° to 180° C. A temperature in this range is favorable for the reaction to proceed rapidly and for insolubilization and texturization of the protein contained in the okara to completeness. The pressure for the treatment should usually be in the range from 20 to 200 kg/cm$^2$G although it is influenced by several factors including the velocity of rotation of the screws in the twin-screw extruder, the feed rate of the starting okara and the like.

The velocity of revolution of the screws in the twin-screw extruder machine is usually in the range from 40 to 250 r.p.m. although it should be controlled depending on several factors including the water content in the starting okara, feed rate and the like.

When the okara as the starting material is treated under the above described conditions, it is processed into a textured okara product. The water content in the thus obtained processed okara product is usually not much less than the starting okara.

The extent of texturization in the processed okara product prepared by the present process can be examined by electrophoresis with SDS polyacrylamide, referred to as the SDS-PAGE method hereinafter. The protein molecules are assumed to be reacted with each other through peptide linkages and thus firmly texturized. The thus texturized material formed by this reaction is insoluble in water and cannot be solubilized unless it is treated with an enzyme, acid or alkali. When certain special reagents are used, however, the solubilization of the textured product become possible by the scission of the hydrogen bonds, sulfide linkages —S—S specific to the soybean proteins and the like, e.g., by dipping the product in a solution containing SDS and a reagent effective for the scission of the sulfide linkage such as 2-mercaptoethanol. This provides a convenient means for the determination of the degree of texturization by the SDS-PAGE method to examine the amount of the protein fraction dissolved out when the product is dipped in the above mentioned solution. A larger amount of the solubilized protein fraction detected by the method corresponds to a lesser degree of texturization.

FIG. 1 is exemplary of the results obtained in the determination of the solubilized protein fractions from the okara products treated at varied temperatures. When the temperature is about 180° C., individual solubilized protein fractions can hardly be detected indicating that the proteins in the okara have become insolubilized by the reaction and are fully texturized.

Figure 2A:
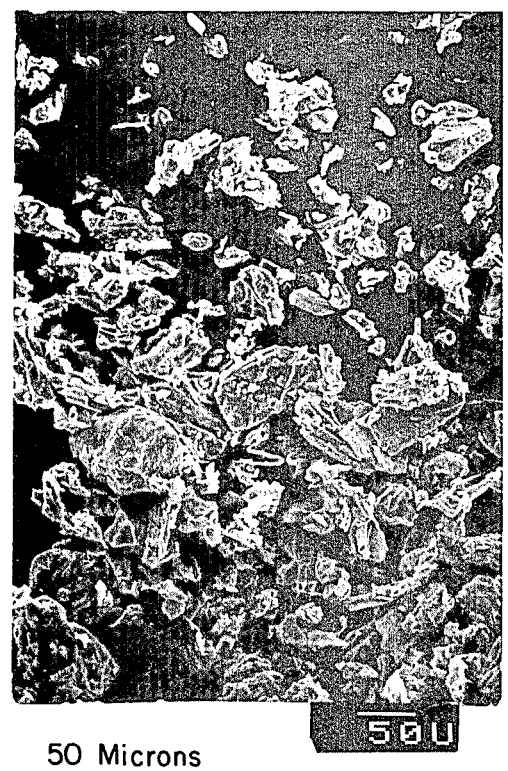
FIGS. 2a and 2b are each an electron microphotograph of the okara before and after the treatment, respectively, indicating the fine structure thereof.
Figure 2B:
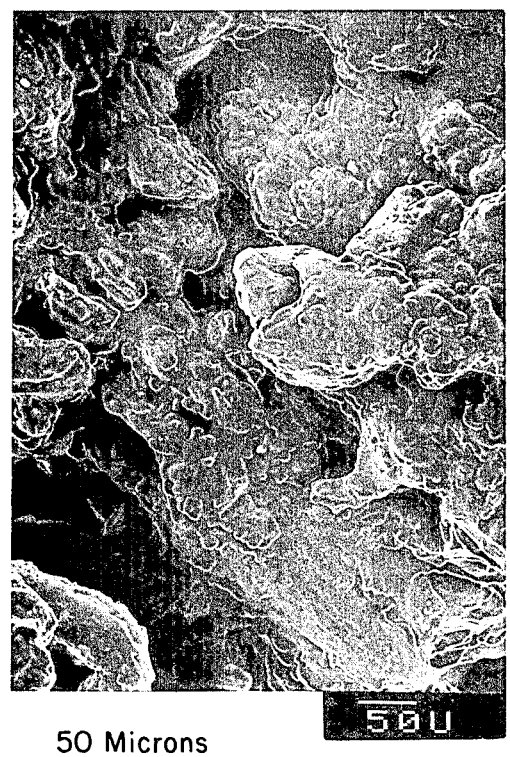
Figure 6:
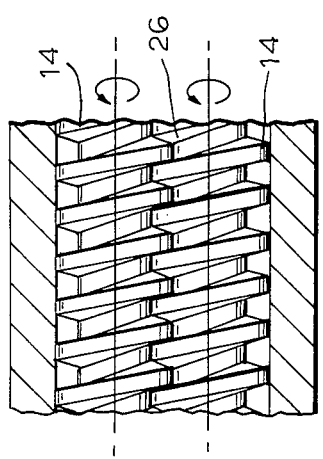
FIG. 6 is a schematic center view illustrating the relative position of the twin screws.

FIGS. 2a and 2b are each an electron microphotograph taken with a scanning electron microscope to examine the morphological changes taking place in the texture of the okara before and after the treatment, respectively. FIG. 2a discloses okara having a particulate structure. In FIG. 2b, no irregular particulate structure which is inherent to the starting okara is present after the treatment of the present process resulting in the texturization of the okara as a whole following melting thereof under the conditions of high temperature and high pressure in the extruder.

The textured okara product prepared by the present method has a meat-like palatability with some soft resilience depending on the water content therein. It is a very useful foodstuff material of high protein content either as such or after being subjected to conventional food processing treatment.

The textured okara product can be dehydrated by a suitable method known in the food processing industry and the thus dehydrated product can be re-hydrated before use so that the product has a very high utility value also in respect of the storability.

Figure 3:
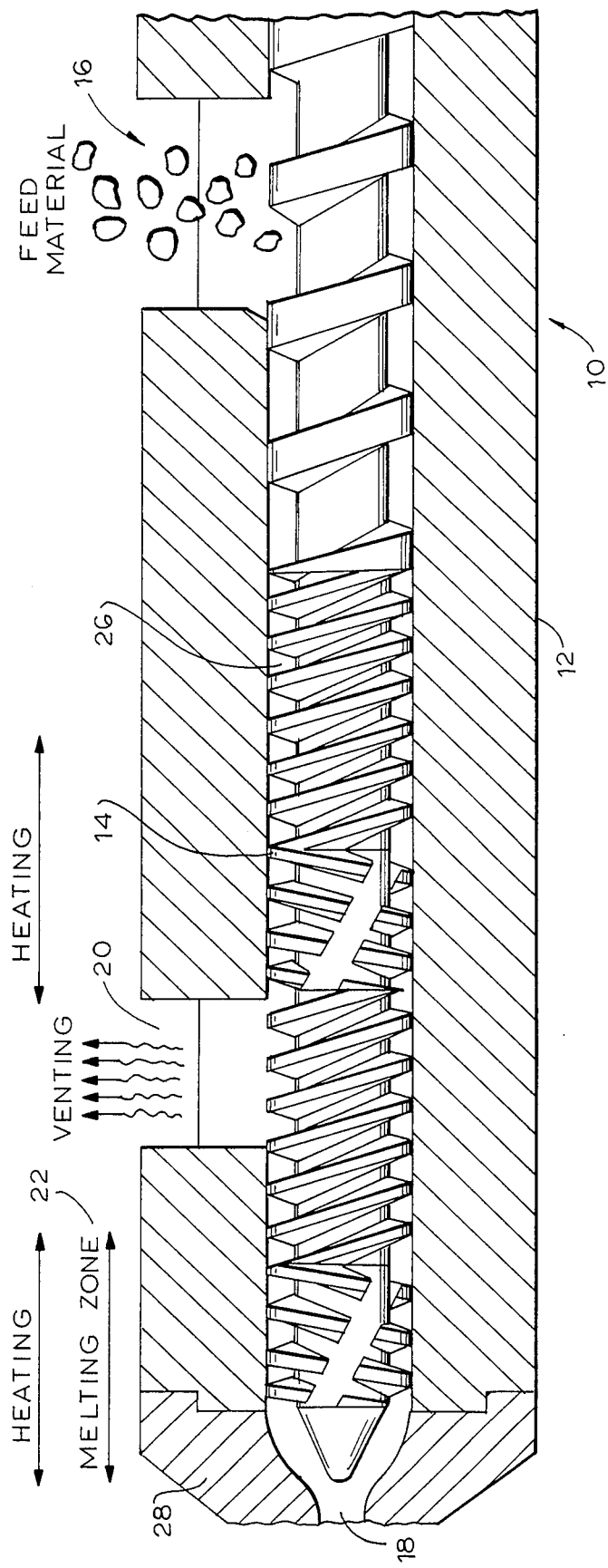
FIG. 3 is a schematic cross-sectional view drawing illustrating the Creusot-Loire BC-45 extruder including cooling die.
Figure 5:
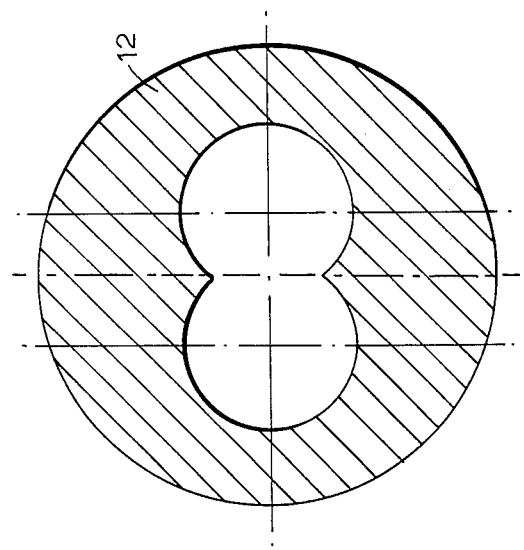
FIG. 5 is a cross-sectional view along line A—A' of FIG. 3 of the barrel housing.

The process of the present invention is further illustrated with reference to FIG. 3 which schematically depicts a twin-screw extruder 10 having a barrel housing 12 encasing intermeshing twin-screw rotors 14. The feed material is fed through feed port 16 into the so-called "C-shaped" (also known as "chevron shaped") spaces 26 formed by the intermeshing lands and grooves of the twin-screw rotors. The rotation of the rotors moves the okara toward the exit port 18 acting as a conveyer. The relative configuration of the respective rotors is preferably such that the cross-sectional area of the spaces 26 between the respective lands and grooves decreases in the direction of the exit port 18 thereby increasing the pressure with a resulting increase in temperature. The respective shapes of the lands and grooves are also such that the so-called leakage path is minimized thereby preventing pressure loss. Twin-screw rotors having such configurations are well known for use in extruders and also as compressors for both elastic materials and inelastic materials.

The okara often contains undesirable bean flavor resulting from the soybean processing in the presence of water. These flavor components usually have a boiling point of less than about 100° C. It is therefore preferable that the extruder include a vent in the housing in communication with the twin-screws so that these undesirable odor components escape as the okara is heated during the processing. The vent 20 is positioned in the direction of the feed and before the melting zone 22.

Figure 4:
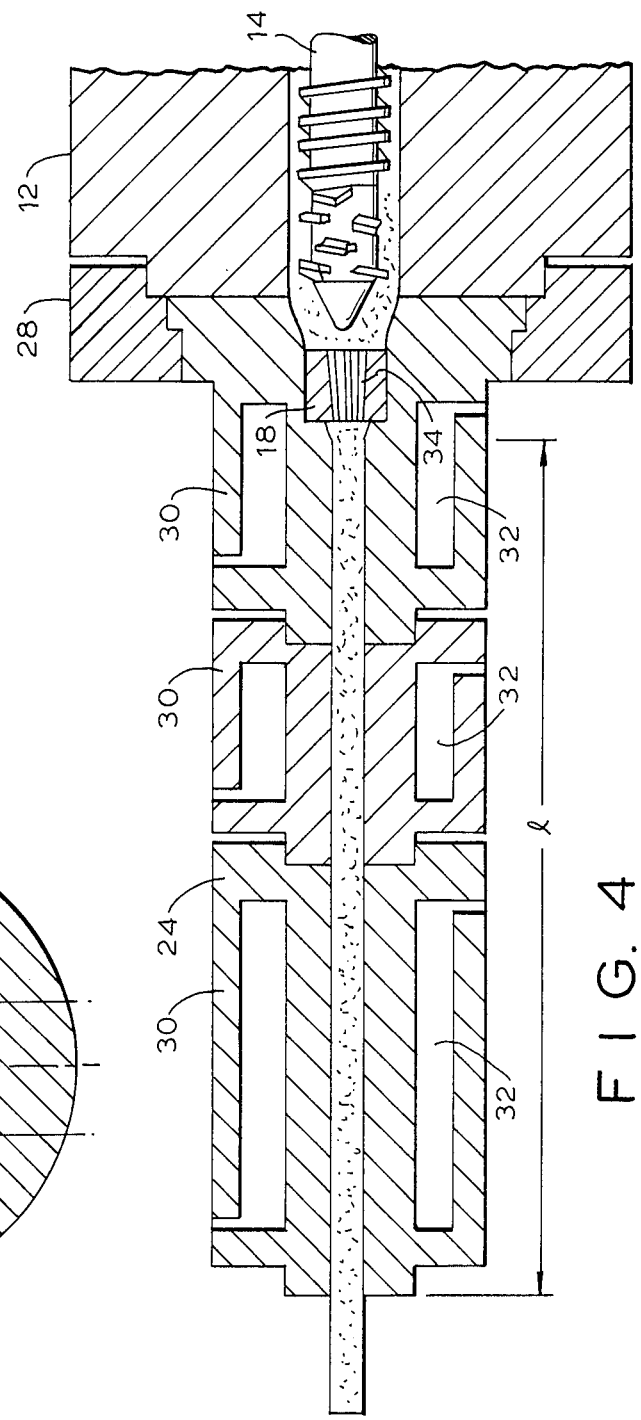
FIG. 4 is a cross-sectional view of the exit port of the extruder and the cooling die assembly attached thereto.

The exit port 18 preferably has a cross section sufficiently small so that the pressure within the extruder is increased as a result of the necessity to force the processed okara through the exit port. The exit port 18 preferably is a plate structure 34 having a plurality of narrow holes leading from the screws to the outside of the exit port as illustrated in FIG. 4. The exit port is contiguous with and in direct contact with the cooling die 24 wherein the processed okara is cooled which increases the consistency thereby further increasing the resistance to flow and further tending to increase the pressure which the twin-screws must exert to force the product okara through the extruder and through the cooling die which is an extension of the extruder. The cooling die is mounted to the exit end of the extruder through cooling die holder 28. The cooling die comprises a segmented die 30 containing cooling chambers 32. The cooling die length "1" is sufficient so that the product okara is cooled to a temperature of between 70° and 5° C. and preferably between 40° and 20° C.

The pressure referred to hereinbefore is measured in the extruder adjacent the exit port. The temperature of processing identified hereinbefore is also preferably measured at this position in the extruder. This can be carried out using a Dynisco pressure probe with a built-in thermocouple.

The present process is further illustrated by the following example.

EXAMPLE 1

A wet okara from a tofu manufacturing process and/or a hydrated okara from a soybean milk manufacturing process each containing 80% by weight of water is fed into a twin-screw extruder, Model BC 45 made by Creusot-Loire, France, equipped with a long cooling die. The temperature of the barrel was controlled at 170° C. and the temperature at the die exit was 5° C. The feeding rate of the starting material was controlled at 10 kg/hour by use of a Monod pump with the screws rotating at 60 r.p.m.

The product obtained by the above mentioned processing conditions was found to be fully texturized and retained its original form when it was subjected to freeze drying or when dipped in water absolutely without extreme swelling or destruction of the structure in each case indicating completeness of the texturization. The color of the product was agreeably light yellow without darkening into brownish.

The water content of the product is almost the same, about 80% by weight, as that of the starting material. The product had a soft and acceptable palatability. Examination with a scanning electron microscope indicated a spongy or fibrous structure without the particulate morphology inherent in the unprocessed okara.

EXAMPLE 2

A hydrated okara from a tofu manufacturing process was admixed with a defatted soybean flour having a nitrogen solubility index NSI of about 30 and containing 55% of crude protein and 10% of water in an amount of 20% by weight based on the overall amount of the blend. The final water content in the thus blended starting material was adjusted to 70% by weight. This starting material was subjected to the treatment in the same twin-screw extruder machine as in Example 1 under the conditions of: 14 kg/hour of the feeding rate of the starting material; 180° C. barrel temperature; 60 r.p.m. screw revolution; and 4° C. at the exit of the cooling die.

The product obtained under the above described conditions was found to be fully texturized with a tensile breaking strength of $2.5 \times 10^3$ g/cm$^2$, which was much larger than the corresponding value of $1.5 \times 10^3$ g/cm$^2$ obtained for the okara without the flour additive by virtue of the increased degree of texturization accompanying the increase in the overall protein content resulting from the admixture of the defatted soybean flour. The product was evaluated to be more fibrous and to be a more resilient meat-like foodstuff material than that obtained without the admixture of the defatted soybean flour. The color of the product was also agreeably light yellow. The original form of the product could be retained even after dipping in water. Examination with a scanning electron microscope and an optical microscope indicated abundant presence of a fibrous fine structure supporting the fibrous nature of the thus texturized product.

While the invention has been described above with respect to specific embodiments, various modifications and alterations can be made to the specific implementations within the scope of the appended claims.

I claim:

1. A process for the preparation of a textured okara useful as a food component comprising feeding okara to a twin-screw extruder having a melting zone and heating and applying pressure in said extruder to said okara and forcing said okara through a constricted exit port from said extruder into and through a cooling die at a temperature from room temperature to 0° C. wherein said okara is cooled and said cooled okara having a textured structure is forced out of the cooling die, said okara being heated in the melting zone of said extruder, said melting zone having a temperature of from 140° to 200° C. and the pressure in said extruder being between 20 and 200 kg/cm$^2$G.

2. The process of claim 1, wherein the water content of the okara fed to the extruder is between 5 to 80% by weight.

3. The process of claim 2, wherein said okara is first heated in the feed end of said extruder then passed through a melting zone in said extruder which is adjacent said exit port.

4. The process of claim 3, wherein gases present in said heated okara are vented from the extruder before the okara enters said melting zone.

5. The process of claim 4, wherein the temperature in the melting zone of the extruder is between 160° and 180° C.

6. The process of claim 5, wherein said okara which is fed into the extruder contains between about 20 and 60% water.

7. The process of claim 6, wherein the feed to the extruder also comprises at least one additive selected from the group consisting of soybeans and proteins originating from soybeans and other vegetables.

8. The process of claim 7, wherein said twin screws rotate at between about 40 and 250 r.p.m.

9. The process of claim 2, wherein the temperature in the melting zone of the extruder is between 160° and 180° C.

10. The process of claim 1, wherein the temperature in the melting zone of the extruder is between 160° and 180° C.

11. The process of claim 10, wherein said okara which is fed into the extruder contains between about 20 and 60% water.

12. The process of claim 11, wherein gases present in said heated okara are vented from the extruder before the okara enters said melting zone.

13. The process of claim 12, wherein the feed to the extruder also comprises at least one additive selected from the group consisting of defatted soybeans and proteins originating from soybeans and other vegetables.

14. The process of claim 1, wherein said okara which is fed into the extruder contains between about 20 and 60% water.

15. The process of claim 11, wherein the feed to the extruder also comprises at least one additive selected from the group consisting of defatted soybeans and proteins originating from soybeans and other vegetables.

16. The process of claim 2, wherein said twin screws rotate at between about 40 and 250 r.p.m.

* * * * *

UNITED STATES PATENT AND TRADEMARK OFFICE
CERTIFICATE OF CORRECTION

PATENT NO. : 4,642,241
DATED : February 10, 1987
INVENTOR(S) : A. NOGUCHI

It is certified that error appears in the above-identified patent and that said Letters Patent is hereby corrected as shown below:

Column 8, line 1 (Claim 7), before "soybeans", insert --defatted--.

Signed and Sealed this

Nineteenth Day of January, 1993

Attest:

DOUGLAS B. COMER

Attesting Officer     Acting Commissioner of Patents and Trademarks